United States Patent
Chou et al.

(10) Patent No.: US 10,824,366 B2
(45) Date of Patent: Nov. 3, 2020

(54) METHOD FOR RECORDING DURATION OF USE OF DATA BLOCK, METHOD FOR MANAGING DATA BLOCK USING THE SAME AND RELATED DEVICE

(71) Applicant: Silicon Motion, Inc., Jhubei, Hsinchu (TW)

(72) Inventors: Po-Sheng Chou, Hsinchu (TW); Tsung-Yao Chiang, New Taipei (TW)

(73) Assignee: Silicon Motion, Inc., Hsinchu (TW)

( * ) Notice: Subject to any disclaimer, the term of this patent is extended or adjusted under 35 U.S.C. 154(b) by 64 days.

(21) Appl. No.: 15/219,227

(22) Filed: Jul. 25, 2016

(65) Prior Publication Data
US 2017/0286012 A1    Oct. 5, 2017

(30) Foreign Application Priority Data

Mar. 31, 2016 (TW) .............................. 105110338 A (51) Int. Cl.
*G06F 3/06* (2006.01)
(52) U.S. Cl.
CPC .......... *G06F 3/0653* (2013.01); *G06F 3/0604* (2013.01); *G06F 3/0679* (2013.01)
(58) Field of Classification Search
CPC .... G06F 3/0616; G06F 3/0619; G06F 3/0625; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768;
(Continued)

(56) References Cited

U.S. PATENT DOCUMENTS 7,434,122 B2    10/2008    Jo
7,516,267 B2    4/2009    Coulson et al.
(Continued)

FOREIGN PATENT DOCUMENTS

CN    103927272 A    7/2014

OTHER PUBLICATIONS

M. L. Simpson, C. L. Britton, A. L. Wintenberg and G. R. Young, "An integrated CMOS time interval measurement system with subnanosecond resolution for the WA-98 calorimeter," in IEEE Journal of Solid-State Circuits, vol. 32, No. 2, pp. 198-205, Feb. 1997 (Year: 1997).*

(Continued)

*Primary Examiner* — Daniel C. Chappell
*Assistant Examiner* — Leandro R Villanueva (57) ABSTRACT

A method for recording a duration of use of a data block is disclosed, as well as a data storage device implementing that method. The data block is either an in-use data block or an empty data block. The method includes steps of: receiving and writing data into one of the in-use data blocks and writing a program time and a time interval of the data into the in-use data block. Wherein the time interval is a difference between the program time and an initial program time of the in-use data block, and the initial program time was recorded when the in-use data block wrote a first piece of data.

6 Claims, 5 Drawing Sheets

(58) Field of Classification Search
CPC .......... G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153
See application file for complete search history.

(56) References Cited

U.S. PATENT DOCUMENTS

| | | | | |
|---|---|---|---|---|
| 9,588,709 | B2* | 3/2017 | Yang | G11C 11/5628 |
| 9,953,709 | B2* | 4/2018 | Shirakawa | G06F 3/0679 |
| 10,394,480 | B2* | 8/2019 | Tsuruya | G06F 12/04 |
| 10,496,289 | B2* | 12/2019 | Margalit | G06F 3/064 |
| 2005/0182888 | A1* | 8/2005 | Murotani | G06F 11/1456 |
| | | | | 711/1 |
| 2007/0180328 | A1 | 8/2007 | Cornwell et al. | |
| 2008/0307270 | A1 | 12/2008 | Li | |
| 2009/0106519 | A1 | 4/2009 | Lin et al. | |
| 2011/0138144 | A1* | 6/2011 | Tamura | G06F 3/0608 |
| | | | | 711/166 |
| 2011/0196901 | A1* | 8/2011 | Kesselman | G06F 17/30336 |
| | | | | 707/813 |
| 2013/0326125 | A1* | 12/2013 | Chang | G06F 12/0246 |
| | | | | 711/103 |
| 2014/0281260 | A1* | 9/2014 | Peterson | G06F 3/0616 |
| | | | | 711/135 |
| 2015/0046747 | A1* | 2/2015 | Gaertner | G06F 11/1441 |
| | | | | 714/6.11 |
| 2015/0161034 | A1* | 6/2015 | Fisher | G06F 3/064 |
| | | | | 711/103 |

OTHER PUBLICATIONS

H. Zhang, X. Li and Y. Bian, "High-Resolution and Multi-Channel Time Interval Counter Using Time-to-Digital Converter and FPGA," 2007 IEEE International Frequency Control Symposium Joint with the 21st European Frequency and Time Forum, Geneva, 2007, pp. 1324-1326 (Year: 2007).*

Notice of Allowance issued by Taiwan Intellectual Property Office dated Nov. 30, 2016.

* cited by examiner

METHOD FOR RECORDING DURATION OF USE OF DATA BLOCK, METHOD FOR MANAGING DATA BLOCK USING THE SAME AND RELATED DEVICE

FIELD OF THE INVENTION

The present invention relates to a method for recording a duration of use of a data block, and more particularly to a method for recording a duration of use of a data block in a non-volatile memory, a method for managing data block using the same and related device.

BACKGROUND OF THE INVENTION

Non-volatile memory is an electronic memory device with specific abilities such as maintaining data without extra power, fast data access and shockproof. Therefore, non-volatile memory is widely used in memory cards, solid state drives (SSD) and portable multimedia devices. Non-volatile memory includes a plurality of data blocks for storing data. Specifically, according to the using situation, each data block may be defined as an in-use data block or an empty data block; wherein in-use data block is referred to as a data block saving valid data and empty data block is referred to as a data block not saving valid data. Therefore, a data block is changed from an empty data block to an in-use data block once a first record of data is written therein. Generally speaking, an in-use data block can be repeatedly written with data until the storing space thereof is full with data; and consequentially, an incoming data will be saved into the next empty data block. In generally, an in-use data block is in a word line open state, and is changed from in a word line open state to in a word line close state once the in-use block has no any storing space for data. However, when a data block is operated in the word line open state for too long, the non-volatile memory may have data retention or data distortion problems resulted by the effects of electricity of the non-volatile memory itself and impact of continuous access on the non-volatile memory. On the contrary, the data retention problem seldom occurs when a data block is in the word line close state. Therefore, it is quite important to develop method and related device able to solve the data retention problems resulted by operating the data block in the word line open state for too long.

SUMMARY OF THE INVENTION

Accordingly, one objective of the present invention is to provide method for recording a duration of use of a data block and related devices, which are able to avoid data damage resulted by the data block having a too-long open time.

The present invention provides a method for recording a duration of use of a data block of a non-volatile memory. The non-volatile memory includes a plurality of in-use data blocks and empty data blocks. The data block is either the in-use data blocks or the empty data blocks. The method includes steps of: receiving and writing data into one of the in-use data blocks; and writing a program time of the data and a time interval into the in-use data block, wherein the time interval is a difference between the program time of the data and an initial program time of the in-use data block, and the initial program time is recorded when a first piece of data is written into the in-use data block.

The present invention further provides a method for managing a data block of a non-volatile memory. The non-volatile memory includes a plurality of in-use data blocks and empty data blocks. The data block is either the in-use data blocks or the empty data blocks. The method includes steps of: generating a duration of use of the in-use data block according to a method for recording the duration of use of the data block of the non-volatile memory; and changing an empty data block into a second in-use data block and writing data saved in the in-use data block into the second in-use data block when the duration of use is greater than a threshold. The duration of use is a difference between a current time and an initial program time of the in-use data block.

The present invention still further provides a data storage device, which includes a non-volatile memory and a memory controller. The non-volatile memory includes a plurality of data blocks. The data blocks are either in-use data blocks or empty data blocks. The memory controller is electrically coupled to the non-volatile memory and configured to write data, program times and time intervals of the data into one of the in-use data blocks. The time interval is a difference between the program time and an initial program time of one of the in-use data blocks.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
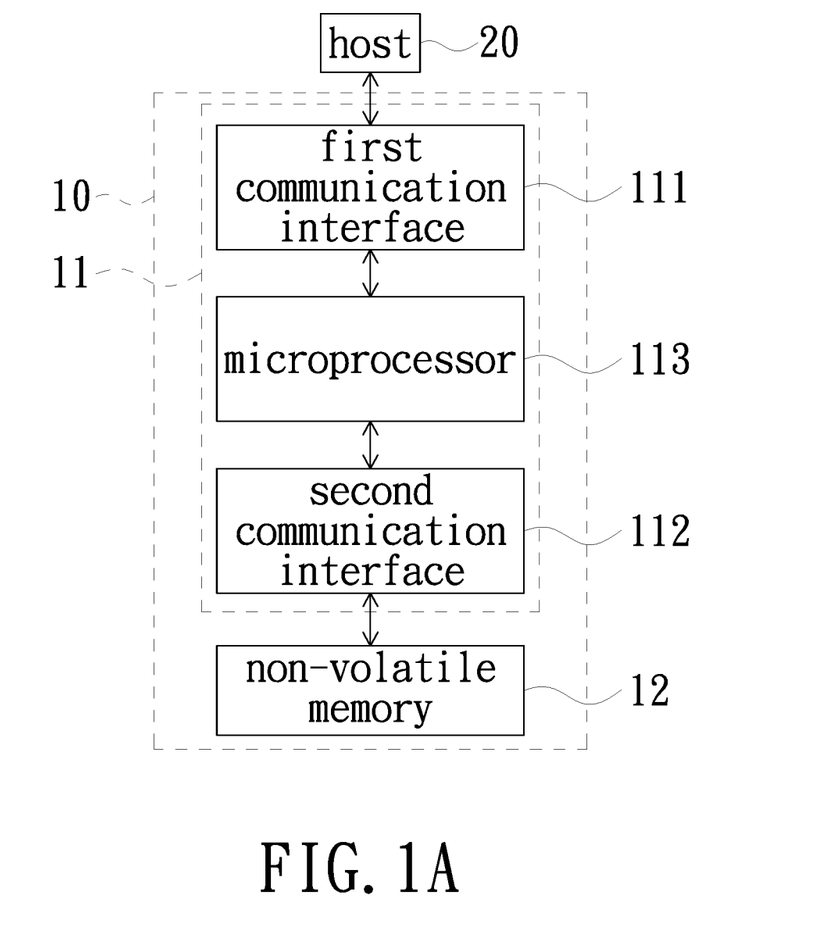
FIG. 1A is a schematic block view of a data storage device in accordance with an embodiment of the present invention.

Please refer to FIG. 1A, which is a schematic block view of a data storage device in accordance with an embodiment of the present invention. As shown, the data storage device 10 of the present embodiment is able to communicate with an external host 20 and configured to program received written data according to a write instruction issued from the host 20. The host 20 may be an electronic device such as a desktop or a tablet computer. The data storage device 10 includes a memory controller 11 and a non-volatile memory 12. The non-volatile memory 12 may be a flash memory, MRAM (Magnetic RAM), FRAM (Ferroelectric RAM), PCM (Phase Change Memory), STTRAM (Spin-Transfer Torque RAM), ReRAM (Resistive RAM) and Memristor. The memory controller 11 is electrically coupled to the host 20 and the non-volatile memory 12. The memory controller 11 includes a first communication interface 111, a second communication interface 112 and a microprocessor 113. The microprocessor 113 is electrically coupled to the first communication interface 111 and the second communication interface 112. The memory controller 11 is in communication with the host 20 through the first communication interface 111 so as to receive the aforementioned write instruction and data to be programmed. The memory controller 11 is further in communication with the non-volatile memory 12 through the second communication interface 112 so as to access the non-volatile memory 12. In one embodiment, the first communication interface 111 may be serial advanced technology attachment (SATA), universal serial bus (USB), peripheral component interconnect express (PCI Express), non-volatile memory express (NVMe), universal flash storage (UFS), embeddedMultiMedia card (eMMC) or secure digital input/output (SDIO). In one embodiment, the second communication interface 112 may be open NAND flash interface (ONFI) or Toggle.

Figure 1B:
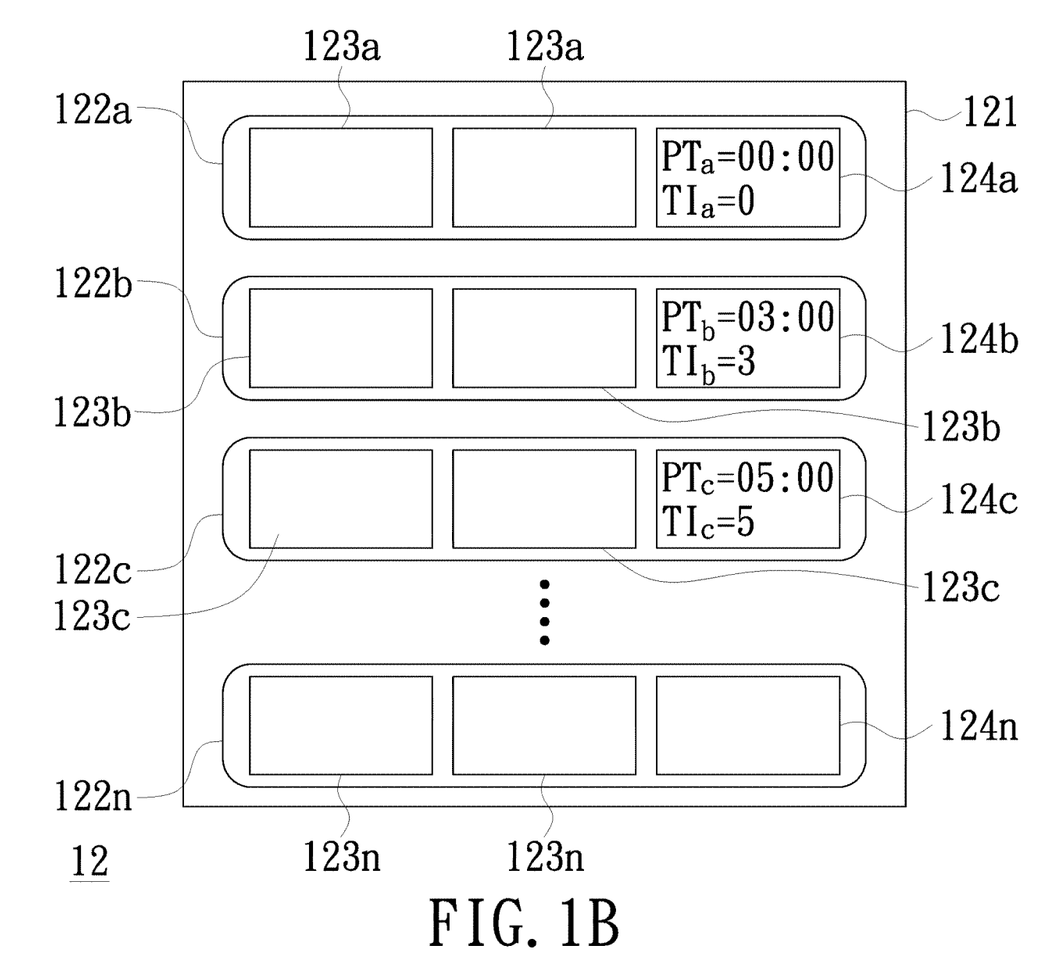
FIG. 1B is a schematic view of a non-volatile memory in accordance with an embodiment of the present invention.

Next, please refer to FIG. 1B, which is a schematic view of the non-volatile memory 12 (or the flash memory 12) in accordance with an embodiment of the present invention. As shown, the non-volatile memory 12 includes a plurality of data blocks 121 (herein only one data block 121 is exemplarily shown). Each data block 121 includes a plurality of data pages 122a, 122b, 122c, . . . , and 122n; wherein a, b, c, . . . , and n are integers, such as a=1, b=2, c=3 and n=256 in one embodiment. Word lines (not shown) are used to control the access of the data page 122a-122n. Specifically, for the flash memory with single-level cell (SLC), each word line can control the access of one data page; for the flash memory with multi-level cell (MLC), each word line can control the access of two data page; for the flash memory with triple-level cell (TLC), each word line can control the access of three data page; and so on. Hereafter the flash memory with single-level cell will be taken as an example for the description of the present invention; however, it is understood that the present invention is not limited thereto.

With the development of technology, today each one of the data pages 122a-122n can store more than one record of data. For example, each one of the data pages 122a-122n may store eight records of 512-byte data. However, to simplify the description of the present invention, it is assumed that each one of the data pages 122a-122n in the present embodiment can store only one record of data; but the present invention is not limited thereto. In addition, besides data areas 123a, 123b, 123c, . . . , and 123n for storing data, the data pages 122a-122n further include spare areas 124a, 124b, 124c, . . . , and 124n for storing extra data, such as metadata, respectively. In the present embodiment, specifically, the spare areas 124a-124n are used to store program time and time intervals of the data pages 122a-122n, respectively. In the present invention, the time interval is referred to as a time difference between the programming time of the first record of data and the program time of the current record of data (written into the same data block). As illustrated in FIG. 1B, for example, the programming time PTa in the data page 122a is 00:00 which indicates that the first record of data is programmed into the data page 122a at time 00:00; the program time PTb in the data page 122b is 03:00 which indicates that the second record of data is programmed into the data page 122b at time 03:00, therefore the time interval Tlb of the second record of data is 3 (unit in hours); and the program time PTc in the data page 122c is 05:00 which indicates that the third record of data is written into the data page 122c at time 05:00, therefore the time interval Tlc of the third record of data is 5. In the present invention, it is understood that more bits are used for recording the time interval, the more accurate the time interval is. For example, if a sufficient number of bits are used, the time interval may have a unit in minutes in another embodiment.

In addition, due to the continuity of data, the data received by the data block 121 is programmed into the data pages 122a-122n in sequence. Therefore, if there are three continuous records of data sequentially programmed into the same data block, the first record of data may be defined as the prior data; the second record of data may be defined as the current data; and the third record of data may be defined as the later data. Accordingly, the prior data, the current data and the later data are sequentially programmed into the prior data page (e.g., the data page 122a), the current data page (e.g., the data page 122b) and the later data page (e.g., the data page 122c), respectively. Further, the data page 122a saves the prior program time and the prior time interval of the prior data; the data page 122b saves the current program time and the current time interval of the current data; and the data page 122c saves the later program time and the later time interval of the later data. To simplify the description of the present invention, the data, program time and time interval are referred to the current data, current program time and current time interval, respectively, if no specifying. Further, if there are only three data pages (e.g., the data pages 122a, 122b and 122c) saved with data in the data blocks 121, the third data page (e.g., the data page 122c) is referred as the latest data page in the data block 122. Once the fourth data page (e.g., the data page 122d) saves data, the fourth data page (e.g., the data page 122d) replaces the third data page (e.g., the data page 122c) as the latest data page in the data block 122, and so on.

Figure 2A:
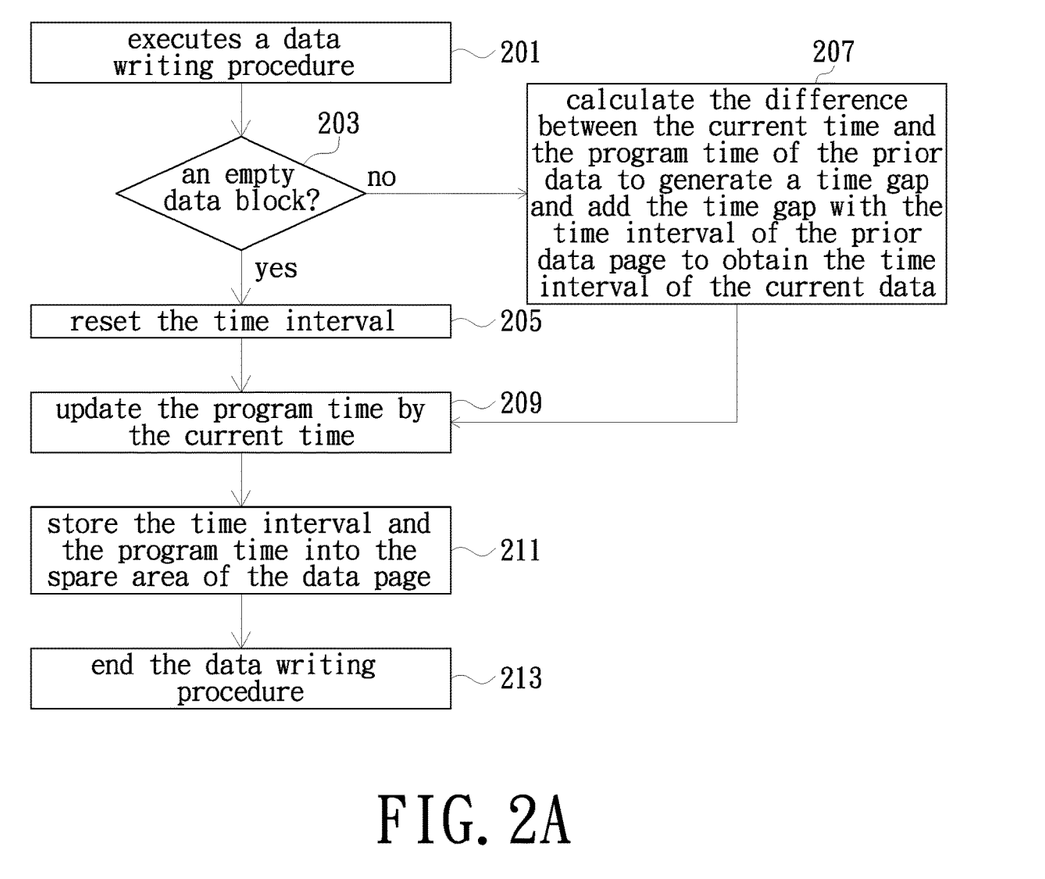
FIG. 2A is a flowchart of a method for recording a duration of use of a data block in accordance with the first embodiment of the present invention.

FIG. 2A is a flowchart of a method for recording a duration of use of a data block in accordance with the first embodiment of the present invention. Please refer to FIGS. 1A, 1B and 2A together. First, when the data storage device 10 receives the write instruction with the written data from the host 20, the microprocessor 113 in FIG. 1A executes a data programming procedure (step 201) to program the written data into the data block 121. The microprocessor 113 determines whether the data shall be programmed into an empty data block or not (step 203). When the determining result obtained in step 203 is Yes which indicates that the written data shall be programmed into an empty data block. The microprocessor 113 programs the written data into the data area 123a of the data page 122a of the data block 121, resets the time interval Tla of the data page 122a (or the current data) to 0 (step 205) and updates the program time PTa by the current time (step 209). Then, the microprocessor 113 saves the time interval Tla and the program time PTa into the spare area 124a of the data page 122a (step 211). As illustrated in FIG. 1B, for example, the spare area 124a of the data page 122a is written with the time interval Tla (e.g., 0) and the program time PTa (e.g., 00:00). Then, the microprocessor 113 ends the data writing procedure (step 213). Because of the data page 122a is the first data page written with data in the data block 121 (or, the data page 122a is written with the first record of data), the program time PTa of the data page 122a is also referred as the initial program time of the data block 121. Further, because of being written with data, the data block 121 is changed from an empty data block to an in-use data block, and the subsequent data will continue to be written into the data block 121 until all the data pages therein are written with data.

Alternatively, when the determining result obtained in step 203 is No which indicates that the data block 121 to be written with data is an in-use data block, the microprocessor 113 writes the data into the first empty data page (e.g., the data page 122b) in the data block 121, as illustrated in FIG. 1B. Therefore, the being-written data is defined as the current data; the data page 122b is defined as the current data page; the data saved in the data page 122a is defined as the prior data; and the data page 122a is defined as the prior data page. Herein it is assumed that the current time is 03:00; therefore, the microprocessor 113 calculates the difference between the current time (e.g., 03:00) and the program time PTa (e.g., 00:00) of the prior data to generate a time gap (e.g., 3−0=3) and adds the time gap (e.g., 3) with the time interval TIa (e.g., 0) of the prior data page 122a to obtain the time interval of the current data (or the time interval TIb (e.g., 3+0=3) of the data page 122b (step 207). Then, step 209 is performed to update the program time PTb by the current time, that is, the program time PTb is updated to 03:00. Then, step 211 is performed to write the program time PTb and the time interval TIb of the data page 122b into the spare area 124b of the data page 122b. Then, step 213 is performed to end the data writing procedure.

When another record of data is written into the data page 122c, steps 207, 209, 211 and 213 are repeated so that the microprocessor 113 can obtain the program time PTc (e.g., 05:00) of the data page 122c and the time interval TIc (e.g., 5) and then saves the program time PTc (e.g., 05:00) and the time interval TIc (e.g., 5) into the spare area 124c of the data page 122c. According to the above description, it is understood that the data storage device 10 of the present embodiment can record the program time of the written data of each data page (or the program time of each record of data) in one data block and the time interval between the program time of each data page and the initial program time (or the time interval of each record of data); wherein the aforementioned time interval is regarded as the duration of use of the data block 121 in the present invention.

Figure 2B:
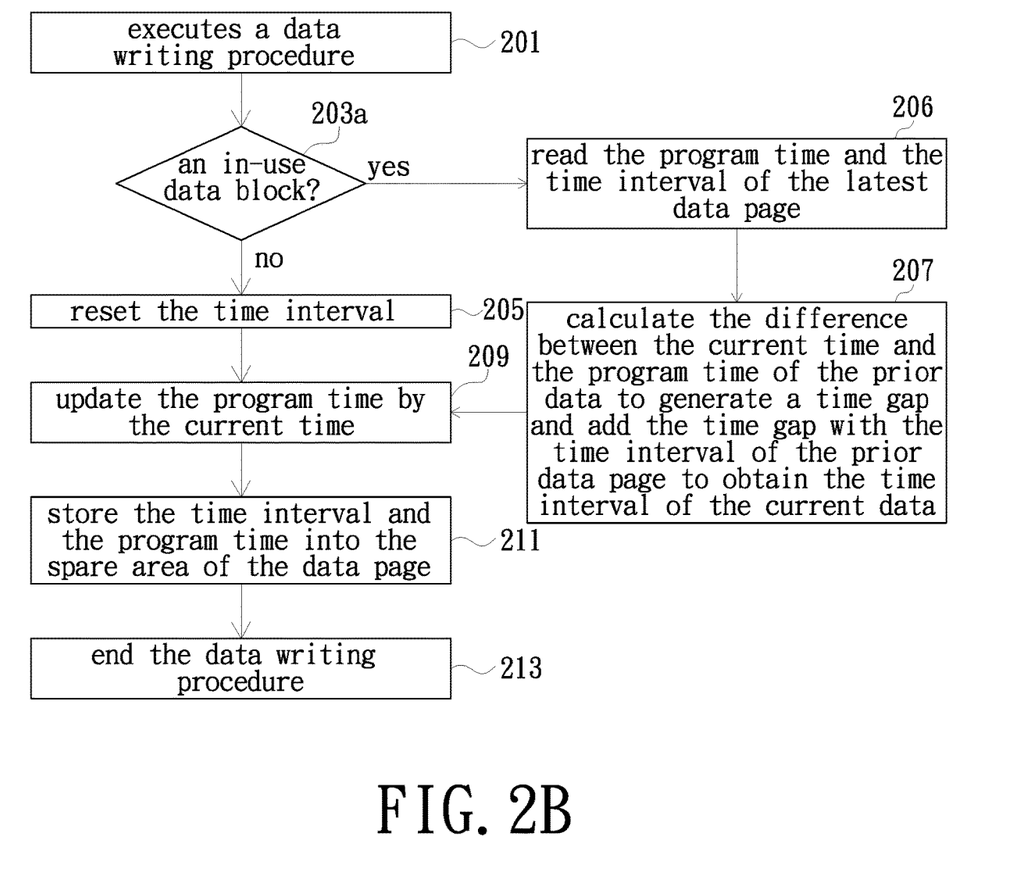
FIG. 2B is a flowchart of a method for recording a duration of use of a data block in accordance with the second embodiment of the present invention.

During the data writing procedure, the data storage device 10 may be accidently powered off and then powered on; and consequentially the program time and the time interval may be lost or reset to 0, which may lead to the re-powered-on data storage device 10 not able to calculate the duration of use of the data block 121 correctly. Therefore, please refer to FIG. 2B, which is a flowchart a method for recording a duration of use of a data block in accordance with the second embodiment of the present invention. As shown in FIG. 2B, when the data storage device 10 is accidently powered off and then powered on and the determining result obtained in step 203a is Yes which indicates that the data block 121 to be written data is an in-use data block, the microprocessor 113 determines the latest data page in the data block 121 and reads the program time and the time interval of the latest data page (step 206). Herein it is assumed that the latest data page in the data block 121 is the data page 122b; therefore, the microprocessor 113 reads the program time PTb and the time interval TIb of the latest data page 122b and obtains the time interval TIc of the data page 122c according to the difference between the current time and the program time PTb and the time interval TIb. Then, step 209 is performed to update the program time PTc by the current time. Then, step 211 is performed to write the program time PTc and the time interval TIb into the spare area 124c of the data page 122c. Then, step 213 is performed to end the data writing procedure.

In the present invention, the microprocessor 113 can obtain information about the prior data page relatively easily; therefore, when writing the current data, the microprocessor 113 can calculate the time interval of the current data based on the information about the prior data page. In one embodiment, the data page 122a only records the respective program time PTa (that is, the initial program time), and the microprocessor 113 obtains the duration of use according to the difference between the current time and the program time PTa of the data page 122a. Namely, in the present embodiment, the calculations of the program time and the time interval are omitted and consequentially the writing times and spaces for the program time and the time interval are saved.

Figure 3:
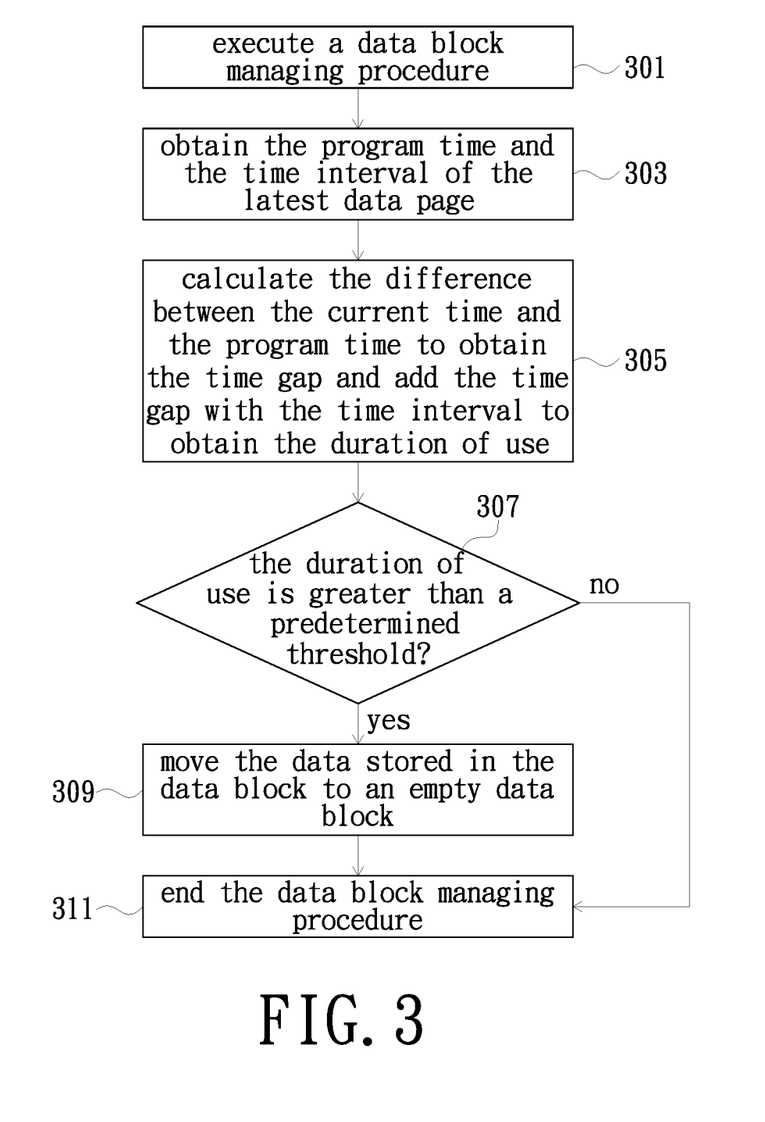
FIG. 3 is a flowchart of a method for managing data blocks by using the above-described method for recording a duration of use of a data block in accordance with an embodiment of the present invention.

Referring to FIG. 3, which is a flowchart of a method for managing data blocks by using the above-described method for recording a duration of use of a data block in accordance with an embodiment of the present invention. Specifically, the method for managing data blocks of the present embodiment calculates the duration of use of the data block 121 according to the program time, the time interval and the current time and then determines whether there is a need to move or write the data in the in-use data block 121 to an empty data block according to the obtained duration of use. As shown in FIG. 3, first, the microprocessor 113 executes a data block managing procedure (step 301). In one embodiment, the data block managing procedure may be executed in some specific situations such as the data storage device 10 is idle or in a power saving mode or the data reading procedure is executed. Then, the microprocessor 113 reads the data saved in the data pages 122a-122n to determine the latest data page in the data block 121 and obtains the program time and the time interval of the latest data page (step 303). As illustrated in FIG. 1B, for example, the data page 122c is the latest data page. Then, the microprocessor 113 calculates the difference between the current time (e.g., 23:00) and the program time PTc (e.g., 05:00) to obtain the time gap (e.g., 23−5=18) and adds the time gap (e.g., 18) with the time interval TIc (e.g., 5) of the data page 122c to obtain the duration of use (e.g., 18+5=23) (step 305). Namely, there are 23 hours between the current time and the initial program time of the data block 121; that is, the data block 121 is under the word line open state for 23 hours. Then, the microprocessor 113 determines whether the duration of use is greater than a predetermined threshold (step 307). Preferably, the predetermined threshold is set to the time length under which the data block in the word line open state can operate normally, for example, 240 hours. In one embodiment, the predetermined threshold can be adjusted with the increments of the erase count or the read count. For example, the predetermined threshold is set to 240 when the erase count is smaller than 100 or the read count is smaller than 1000; and the predetermined threshold is set to 140 when the erase count is greater than 100 or the read count is greater than 1000; but the present invention is not limited thereto. When the determining result obtained in step 307 is Yes which indicates that the duration of use is greater than the predetermined threshold, it is determined that the data block 121 is in the word line open state for too long and consequentially data damage may occur; thus, the microprocessor 113 writes all the data in the data block 121 into an empty data block and erases all the data in the data block 121 (step 309), thereby avoiding the damage of the data saved in the current data block 121. Thus, the data block 121 is changed from an in-use data block to an empty data black and waits for being selected to receive another record of data. Alternatively, when the determining result obtained in step 307 is No which indicates that the duration of use is not greater than the predetermined threshold, it is determined that duration of use of the data lock 121 is in a normal or reasonable range, then, the microprocessor 113 ends the data block managing procedure (step 311).

In summary, besides storing the written data, each data page in an in-use data block further saves the respective program time and the interval time (or the difference between the program time and the initial program time). Therefore, the data storage device of the present invention can calculate the duration of use of the data block and accordingly determines whether there is a need to move or write the data in the in-use data block to an empty data block. As a result, the data damage resulted by operating the data block under the word line open state for a long time is avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for recording a duration of use of a data block of a non-volatile memory, wherein the data block comprises a plurality of data pages, the data block is either an in-use data block or an empty data block, the method comprises the steps of:
   receiving first data and writing the first data into one of the data pages of the plurality of data pages of a data block of the non-volatile memory;
   determining whether the first data is written into a data page of an empty data block or written into a data page of an in-use data block;
   if the first data is written into a data page of an empty data block, resetting a time interval of the data page of the empty data block and updating a program time of the data page of the empty data block to a current time, wherein the data page of the empty data block is an earliest programmed data page of the empty data block;
   and if the first data is written into a data page of an in-use data block, referring to a most recently programmed data page of the in-use data block as a prior data page of the in-use data block, calculating a difference between a current time and a program time of the prior data page of the in-use data block to obtain a time gap, updating a time interval of the data page of the in-use data block according to the time gap and the time interval of the prior data page of the in-use data block, and updating the program time of the data page of the in-use data block to the current time; and
   writing the program time of the data page of the empty data block and a time interval of the data page of the empty data block into a spare area of the data page of the empty data block, wherein the time interval of the page of the empty data block is a difference between the program time of the data page of the empty data block and an initial program time of the empty data block, and the initial program time of the empty data block is the program time of an earliest programmed data page of the empty data block;
   writing the program time of the data page of the in-use data block and a time interval of the data page of the in-use data block into a spare area of the data page of the in-use data block, wherein the time interval of the page of the in-use data block is a difference between the program time of the data page of the in-use data block and an initial program time of the in-use data block, and the initial program time of the in-use data block is the program time of an earliest programmed data page of the in-use data block,
   wherein the step of receiving first data and writing the first data into one of the data pages of the plurality of pages of a data block of the non-volatile memory further comprises steps of:
   determining whether the first data is written into an empty data block after the non-volatile memory is accidentally powered off and then powered on; and
   if no, reading the program time of the prior data page and the time interval of the prior data page, obtaining a time gap according to a difference between a current time and the program time of the prior data page, updating the time interval of the data page of the empty data block according to the time gap and the time interval of the prior data page, and updating the program time of the data page to the current time.

2. A method for managing a data block of a non-volatile memory, wherein the data block comprises a plurality of data pages, the data block is either an in-use data block or an empty data block, the method comprises steps of:
   generating a duration of use of the data block of the non-volatile memory according to a method for recording the duration of use of the data block of the non-volatile memory;
   writing data saved in the data block of the non-volatile memory into an empty data block of the non-volatile memory when the duration of use of the data block of the non-volatile memory is greater than a threshold; and
   erasing the data saved in the data block of the non-volatile memory and changing the data block of the non-volatile memory from being an in-use data block to being an empty data block;
   wherein the duration of use data block of the non-volatile memory is a difference between a current time and an initial program time of the data block of the non-volatile memory, and the method for recording the duration of use of the data block of the non-volatile memory further comprises steps of:
   receiving first data and writing the first data into one of the data pages of the data block of the non-volatile memory;
   determining whether the first data is written into a page of an empty data block of the non-volatile memory or a page of an in-use data block of the non-volatile memory;
   if the first data is written to a data page of the empty block of the non-volatile memory, resetting a time interval of the data page of the empty block of the non-volatile memory and updating the program time of the data page of the empty block of the non-volatile memory to a current time, wherein the data page of the empty block of the non-volatile memory is an earliest data page of the data block;
   and if the first data is written to a data page of the in-use data block of the non-volatile memory, referring to a most recently programmed data page in the in-use data block of the non-volatile memory as a prior data page, calculating a difference between a current time and a program time of the prior data page of the in-use data block of the non-volatile memory to obtain a time gap, updating a time interval of the data page of the in-use block of the non-volatile memory according to the time gap of the prior data page of the in-use data block of the non-volatile memory and the time interval of the prior data page of the in-use data block, and updating the program time of the data page of the in-use data block to the current time; and writing the program time of the data page of the in-use block of the non-volatile memory and the time interval of the data page of the in-use block of the non-volatile memory into a spare area of the data page of the in-use data block of the non-volatile memory, or writing the time interval of the data page of the empty block of the non-volatile memory and the program time of the data page of the empty block of the non-volatile memory into a spare area of the data page of the empty block of the non-volatile memory;

wherein the time interval of the data page of the in-use memory block of the non-volatile memory is a difference between the program time of the data page of the in-use data block of the non-volatile memory and the initial program time of the in-use data block of the non-volatile memory, and the initial program time of the in-use data block of the non-volatile memory is the program time of a most recently programmed data page of the in-use data block of the non-volatile memory;

wherein the step of generating a duration of use of the data block of the non-volatile memory according to a method for recording the duration of use of the data block of the non-volatile memory comprises steps of:

obtaining the program time and the time interval of the most recently programmed data page in the data block; and calculating a difference between the current time and the program time of the most recently programmed data page to obtain a time gap and obtaining the duration of use of the data block according to the time gap and the time interval of the most recently programmed data page.

3. A data storage device, comprising:

a non-volatile memory, comprising at least one data block, wherein the at least one data block comprises a plurality of data pages, and the at least one data block is an in-use data block or an empty data block; and a memory controller, electrically coupled to the non-volatile memory, configured to write data into one of the data pages of the data block, and write a program time and a time interval into a spare area of the data page of the data block, wherein the time interval is a difference between the program time of the data page of the data block and an initial program time of the data block, and the initial program time of the data block is the program time of an earliest programmed data page of the data block;

wherein the memory controller is configured to determine whether the data is written into the empty data block or the data is written into an in-use data block;

wherein when the data is written into the empty data block, the memory controller is configured to reset the time interval of the data page of the empty data block and update the program time of the data page of the empty data block to a current time, wherein the data page of the empty data block is the earliest programmed data page of the empty data block;

wherein when the data is written into the in-use data block, the memory controller is configured to calculate a difference between a current time and a program time of a prior data page of the in-use data block to obtain a time gap, update a time interval of a data page of the in-use data block according to the time gap and a time interval of the prior data page of the in-use data block, and update the program time of the data page of the in-use data block to the current time, wherein most recently programmed data page in the in-use data block is referred to as the prior data page;

wherein when the data is written into the in-use data block after the data storage device is accidentally powered off and then powered on, the memory controller is configured to read the program time of the prior data page and the time interval of the prior data page, obtain an updated time gap according to a difference between the current time and the program time of the prior data page, update the time interval of the data page of the in-use memory block according to the updated time gap and the time interval of the prior data page, and update the program time of the data page of the in-use data block to the current time.

4. The data storage device according to claim 3, wherein when a duration of use of the data blocks is greater than a threshold, the memory controller is configured to write the data saved in the data block into another empty data block of the non-volatile memory, wherein the duration of use is a difference between a current time and the initial program time.

5. The data storage device according to claim 3, wherein the memory controller is configured to read the program time and the time interval of the latest data page of the data-block, obtain a time gap according to a current time and the program time of the latest data page, and obtain a duration of use according to the time gap and the time interval of the latest data page.

6. The data storage device according to claim 3, wherein the data storage device further comprises:

a first communication interface configured for receiving the data from a host and the controller is configured to write the data into the data block.

* * * * *